United States Patent
Hooker et al.

(10) Patent No.: US 7,558,955 B2
(45) Date of Patent: Jul. 7, 2009

(54) METHOD AND APPARATUS FOR SECURE INSTANT MESSAGING UTILIZING SERVER-SUPERVISED PUBLICATION

(75) Inventors: Jeff Hooker, Encinitas, CA (US); James A. Odell, Potomac Falls, VA (US); Robert B. Lord, Sunnyvale, CA (US); Terry N. Hayes, Los Altos, CA (US)

(73) Assignee: AOL LLC, a Delaware limited liability company, Dulles, VA (US)

( * ) Notice: Subject to any disclaimer, the term of this patent is extended or adjusted under 35 U.S.C. 154(b) by 866 days.

(21) Appl. No.: 10/718,290

(22) Filed: Nov. 19, 2003

(65) Prior Publication Data

US 2004/0210772 A1    Oct. 21, 2004

Related U.S. Application Data

(60) Provisional application No. 60/427,568, filed on Nov. 20, 2002.

(51) Int. Cl.
*H04L 9/00* (2006.01)
(52) U.S. Cl. .................. 713/168; 713/156; 713/175; 713/176; 709/204; 715/751; 726/2
(58) Field of Classification Search ............. 713/176, 713/156, 158, 168, 175; 726/2; 709/204, 709/205, 206, 207; 715/751–759
See application file for complete search history.

(56) References Cited

U.S. PATENT DOCUMENTS

| | | | | |
|---|---|---|---|---|
| 5,261,002 A * | 11/1993 | Perlman et al. | ............... | 380/30 |
| 5,657,390 A | 8/1997 | Elgamal et al. | ............... | 380/49 |
| 5,671,279 A * | 9/1997 | Elgamal | ............... | 705/79 |
| 6,161,180 A * | 12/2000 | Matyas et al. | ............... | 713/169 |
| 6,301,609 B1 * | 10/2001 | Aravamudan et al. | ....... | 709/207 |
| 6,324,569 B1 | 11/2001 | Ogilvie et al. | ............... | 709/206 |
| 6,348,935 B1 | 2/2002 | Malacinski et al. | ......... | 345/853 |
| 6,430,602 B1 | 8/2002 | Kay et al. | ............... | 709/206 |
| 6,636,733 B1 | 10/2003 | Helferich | ............... | 455/412 |
| 6,674,725 B2 | 1/2004 | Nabkel et al. | ............... | 370/252 |
| 6,854,057 B2 * | 2/2005 | Roskind et al. | ............. | 713/156 |
| 7,131,003 B2 * | 10/2006 | Lord et al. | ............... | 713/168 |
| 2002/0029350 A1 * | 3/2002 | Cooper et al. | ............... | 713/200 |
| 2002/0032665 A1 * | 3/2002 | Creighton et al. | ............. | 705/76 |
| 2002/0035686 A1 * | 3/2002 | Creighton et al. | ........... | 713/156 |
| 2002/0194471 A1 * | 12/2002 | Benantar et al. | ............ | 713/158 |
| 2003/0046544 A1 * | 3/2003 | Roskind et al. | ............. | 713/176 |
| 2003/0201720 A1 * | 10/2003 | Ooae et al. | .................... | 315/32 |
| 2003/0204741 A1 | 10/2003 | Schoen et al. | ............... | 713/200 |
| 2004/0133774 A1 * | 7/2004 | Callas et al. | ................ | 713/153 |
| 2004/0168055 A1 * | 8/2004 | Lord et al. | ................... | 713/156 |
| 2005/0138364 A1 * | 6/2005 | Roskind et al. | ............. | 713/156 |
| 2007/0050624 A1 * | 3/2007 | Lord et al. | ................... | 713/168 |

(Continued)

OTHER PUBLICATIONS

Home Page; www.lending.etrade.com/e/t/mortgage/home *Lending*; © 2003 E*TRADE Mortgage Corporation.

(Continued)

*Primary Examiner*—Kimyen Vu
*Assistant Examiner*—April Y Shan
(74) *Attorney, Agent, or Firm*—Michael A. Glenn; Glenn Patent Group

(57) ABSTRACT

Digitally signed and encrypted synchronous online messages are conducted between prescribed online messaging service subscribers.

23 Claims, 4 Drawing Sheets

U.S. PATENT DOCUMENTS

2008/0134313 A1* 6/2008 Lord .......................... 726/10

OTHER PUBLICATIONS www.lending.etrade.com/e/t/mortgage/home; *Lending; Live Chat* © 2003 E*TRADE Mortgage Corporation.
www.lending.etrade.com/e/t/mortgage/home; *Lending; Live Chat Send to Chat Hang Up*.
Home Page; www.ceruleanstudios.com; *Trillian Pro* 2.01.
www.ceruleanstudios.com; About Us; *History*.
www.ceruleanstudios.com; *Trillian Basic Overview*.
www.ceruleanstudios.com; *Trillian Basic Tech Specs*.
www.ceruleanstudios.com; *Trillian Pro Overview*.
www.ceruleanstudios.com; *Trillian Pro Product Tour*.
www.ceruleanstudios.com; *Trillian Pro Tech Specs*.
Web Page; ZONE Labs; *Smarter Security*; IMsecure® Pro Release History.
Pascal, Carrie L.; *Enabling Chance Interaction Through Instant Messaging*; IEEE Transactions on Professional Communication; vol. 46, No. 2, Jun. 2003.
Parviainen, Roland, Peter Barnes; *Mobile Instant Messaging*; Centre for Distance-spanning Technology, Department of Computer Science, Lulea University of Technology, 974 87 Lulea, Sweden; 0-7803-7661-7/03/$17.00/2003 IEEE.
*VeriSign Introduces Expanded SMS and MMS Messaging Services*; PR Newswire. New York: Feb. 24, 2004; http://Proquest.umi.com/pqdweb?index.

* cited by examiner

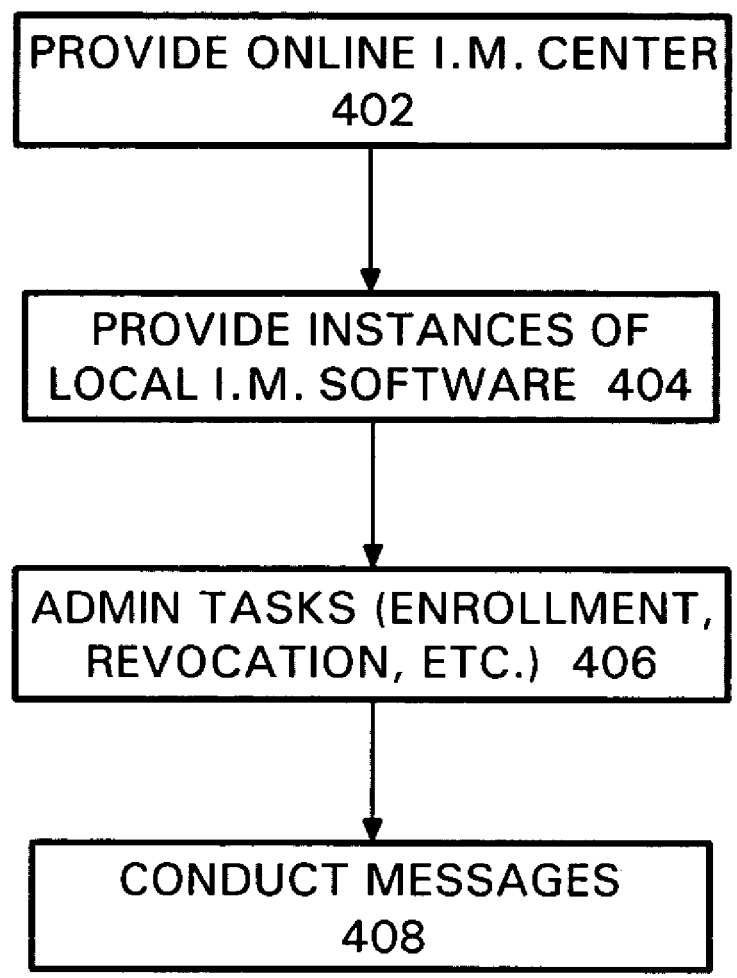

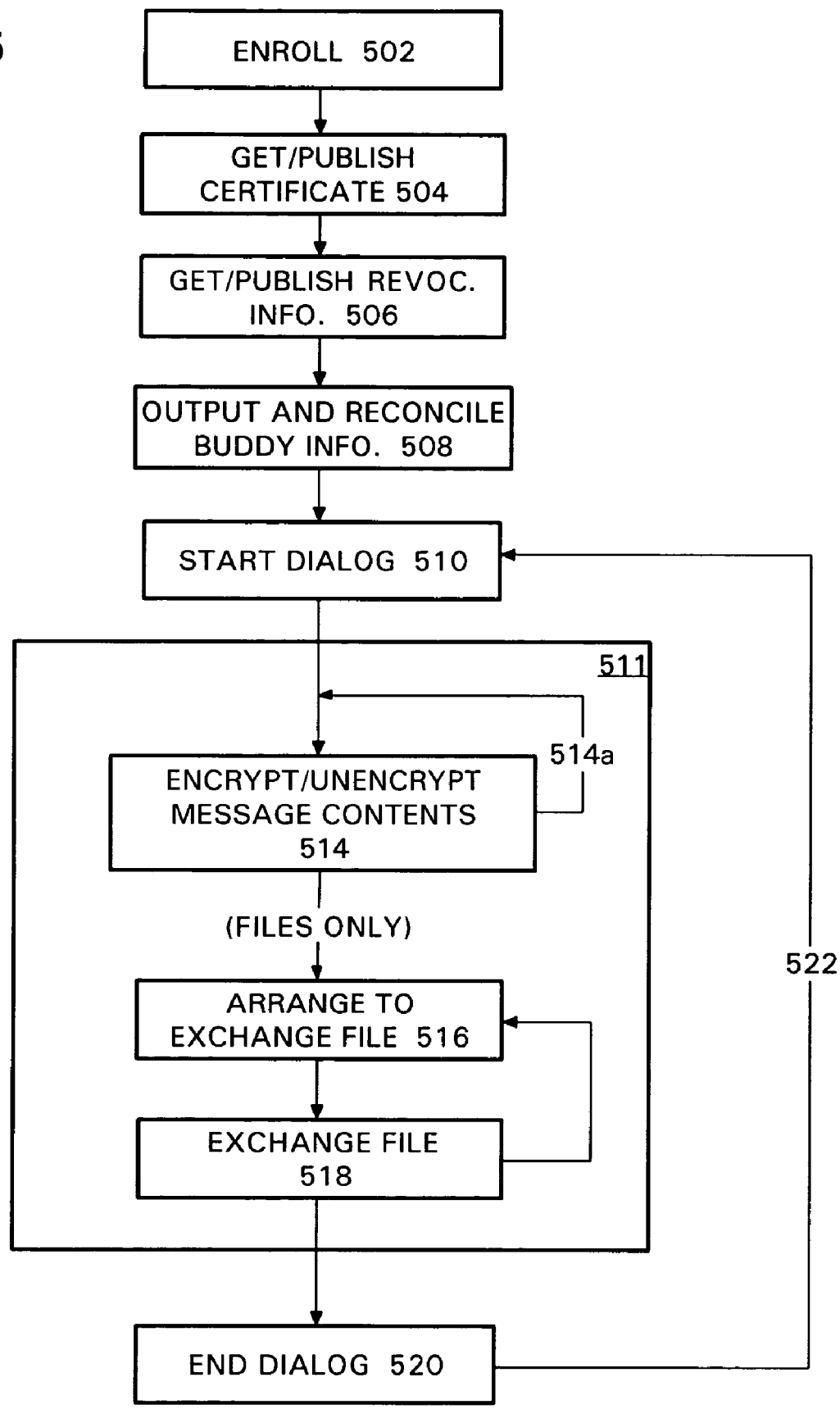

METHOD AND APPARATUS FOR SECURE INSTANT MESSAGING UTILIZING SERVER-SUPERVISED PUBLICATION

CROSS-REFERENCE TO RELATED APPLICATIONS

This application claims the benefit of one or more of the following earlier filed applications in accordance with one or more of 35 USC 119, 120, 365: U.S. Provisional Application No. 60/427,568 entitled "IM Enterprise Features" filed on 20 Nov. 2002 in the names of Hooker et al. The entirety of the foregoing application(s) is hereby incorporated herein by reference.

BACKGROUND OF THE INVENTION

1. Field of the Invention

The present invention relates to methods for people to communicate with each other online. More particularly, the invention concerns a secure synchronous online messaging system.

2. Description of the Related Art

The Internet has dramatically changed the way people communicate. As one example, e-mail enables many people across the world asynchronously exchange messages and attached files. E-mail is relayed from source to destination by mail servers of the sender and receiver. In addition to e-mail, people also communicate over the Internet using chat rooms. With chat rooms, a hosting server conducts real-time communications between participants that have affirmatively logged-in to the server in order to make themselves available to chat with any other users that have entered that chat room. Another mode of Internet communications, instant messaging, involves an instant messaging server that works in real-time to relay messages between participants. Unlike chat rooms, participants need not log into a chat room server. Rather, a user's instant messaging software works with the instant messaging server to search for any of the user's pre-selected instant messaging "buddies" that happen to be online. The user can then invoke the instant messaging server to coordinate one-on-one or group discussions with any one or more of the identified buddies.

Since its introduction, instant messaging has taken the wired world by storm. At home, people use instant messaging to find and conduct friendly online chats with their friends and family. At work, business people use instant messaging to communicate with colleagues, whether located across the country or the same office.

One popular instant messaging service today is AOL Instant Messenger (AIM), which is provided by AMERICA ONLINE INCORPORATED (AOL). AIM is already the subject of various U.S. patents and patent applications. Instant messaging services, such as AIM, represent a significant development in online communications, and therefore enjoy widespread use today. Nonetheless, engineers and software programmers at AOL are still working to enhance and improve the performance, efficiency, and usefulness of today's instant messaging systems. One area of possible focus concerns the security with which instant messages are delivered.

SUMMARY OF THE INVENTION

Broadly, the present disclosure concerns the conduct of secure synchronous online messages between prescribed subscribers, where digital certificates are utilized to sign and encrypt the messages. The teachings of this disclosure may be implemented as a method, apparatus, logic circuit, or a combination of these. This disclosure provides a number of advantages and benefits, which should be apparent from the following description.

BRIEF DESCRIPTION OF THE DRAWINGS

FIG. 4 is a simplified flowchart of a sequence for managing and conducting secured synchronous online messages.

FIG. 5 is a more detailed flowchart of a sequence for managing and conducting secured synchronous online messages.

DETAILED DESCRIPTION

The nature, objectives, and advantages of the invention will become more apparent to those skilled in the art after considering the following detailed description in connection with the accompanying drawings.

Hardware Components & Interconnections

Introduction

Figure 1:
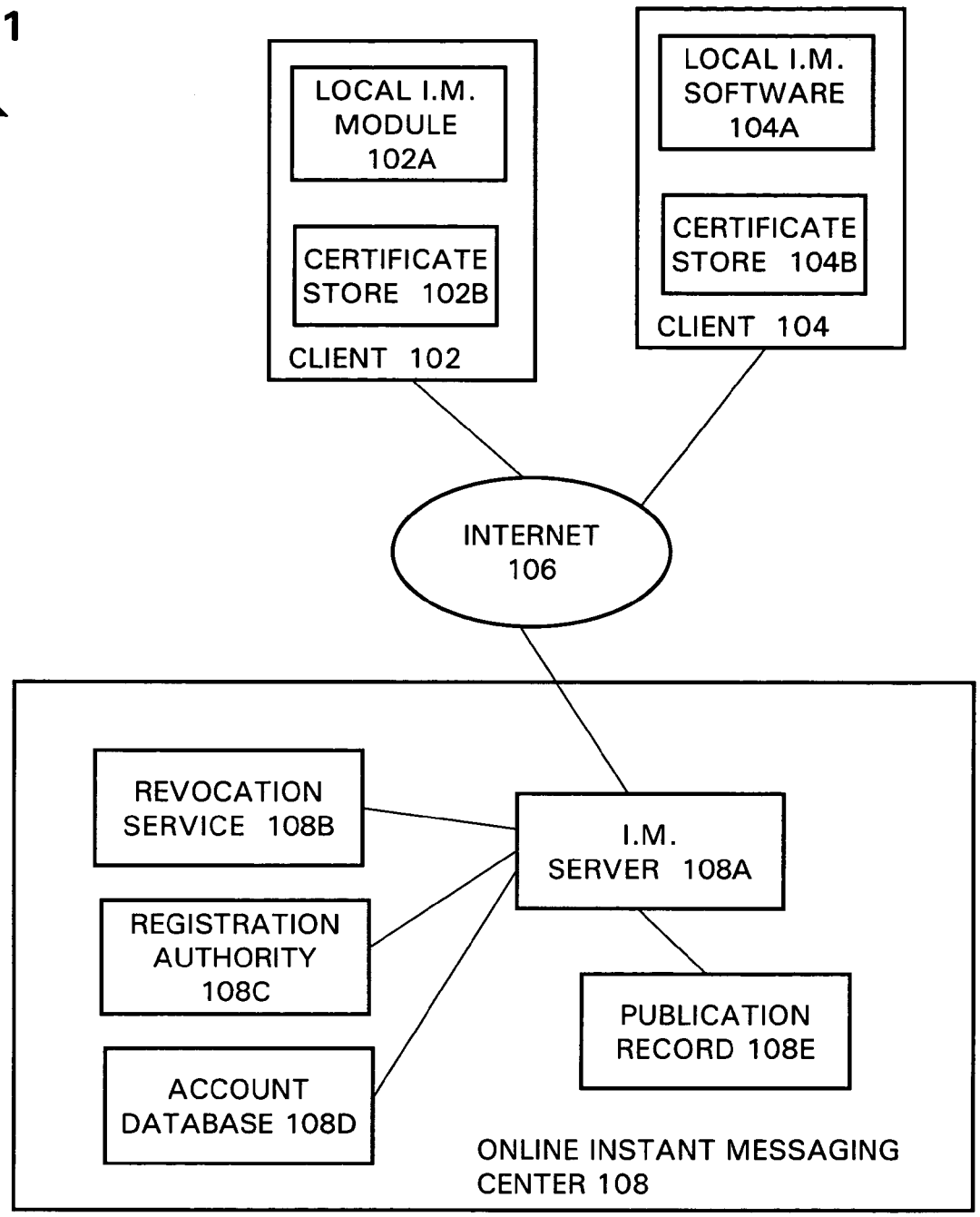
FIG. 1 is a block diagram of the hardware components and interconnections of an instant messaging system.

One aspect of the present disclosure concerns an instant messaging system, which may be embodied by various hardware components and interconnections, with one example being described in FIG. 1. The system 100 includes various subcomponents, each of which may be implemented by one or more hardware devices, software devices, a portion of one or more hardware or software devices, or a combination of the foregoing. The makeup of these subcomponents is described in greater detail below, with reference to an exemplary digital data processing apparatus, logic circuit.

The system 100 as illustrated includes two clients, although in practice there may be hundreds and thousands of clients. The system also includes the Internet 106 and an online instant messaging center 108. Broadly, the clients 102, 104 connect to the center 108 via the Internet 106, whereupon the center 108 assists in conducting instant messages between the clients 102, 104.

Clients

The clients 102, 104 comprise personal computers, web-enabled phones, personal data assistants (PDAs), or other digital data processing devices. The clients 102, 104 may also be referred to as "subscribers" to the instant messaging service of 108. In a typical operating environment, each client 102, 104 is operated by a human "user" (not shown).

Each client 102, 104 includes various subcomponents related to the normal operation of that client device, as would be apparent to an ordinarily skilled artisan familiar with that device. In addition to these subcomponents, each client 102 (or 104) includes some components related to the present disclosure, including a local instant messaging module 102a (or 104a) and a certificate store 102b (or 104b).

Each module 102a/102b comprises a software module, routine, thread, or other local programming to send and receive instant messages. As discussed below, text messages from the clients proceed to the center 108, which forwards the message to the appropriate recipient client. Files and other such attachments may be relayed by the center 108, or exchanged more directly between the clients 102/104 as discussed in greater detail below. The certificate store 102b comprises magnetic disk storage, circuit memory, or other volatile or nonvolatile storage media to store digital security certificates and related information, as described in further detail below. The certificate store 102b may be local to the client 102 (as illustrated), or as an alternative, it may be contained in a remote or central site accessible by network, Internet, or other link.

Online Instant Messaging Service Center

Basically, the center 108 supervises the exchange of instant messages between the clients 102, 104, and may even conduct certain messages. In addition, the center 108 enrolls clients for messaging services, authenticates clients, manages security certificates, and performs other tasks related to the activities of instant messaging.

The center 108 includes various computing components related to the normal operation of an online instant messaging service center, as would be apparent to an ordinarily skilled artisan familiar with online instant messaging systems. Basically, the center 108 includes an instant messaging server 108a, revocation service 108b, registration authority 108c, and account database 108d.

The server 108a comprises a digital data processing apparatus such as one or more personal computers, computer workstations, mainframe computers, computing networks, etc. The server 108a, in one example, comprises a cluster of different server machines programmed to authenticate client machines and relay their instant message traffic.

The items 108b-108d may be separate units, or one or more may be part of the server machinery or part of each other's equipment. The revocation service 108b is software program, thread, subroutine, microprocessor, computer, application specific integrated circuit (ASIC), or other operational entity that performs various functions (described below) to manage the revocation of security certificates. As one example, the service 108b may operate by utilizing online certificate status protocol (OSCP), maintaining a current certificate revocation list (CRL), gathering data from the registration authority 108c and server 108a and clients 102/104, or other techniques. The registration authority 108c manages the registration of clients for secured instant messaging service, and in particular, the issuance of digital certificates for use by the clients. The authority 108c may be implemented by a suitable software program, thread, subroutine, microprocessor, computer, application specific integrated circuit (ASIC), etc. The authority 108c may comprise an independent certificate issuing agency, or an online certificate storefront connected to VERISIGN or another entity in the business of providing online digital certificates and security information. The account database 108d comprises magnetic disk storage, circuit memory, or other volatile or nonvolatile storage media to store data related to instant messaging accounts. For instance, the account database 108d contains each instant messaging user's screen name, password, and level of service paid-for (e.g., secured or unsecured). The publication record 108e stores clients certificates, certificate chains, revocation information, and other data relating to clients' use of digital certificates.

Exemplary Digital Data Processing Apparatus

As mentioned above, data processing entities such as the clients 102, 104, server 108a, revocation service 108b, registration authority 108c, and the like may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of this disclosure uses logic circuitry instead of computer-executed instructions to implement one or more of the functional entities mentioned above. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Operation

Having described the structural features of the present disclosure, the operational aspect of the disclosure will now be described.

Figure 2:
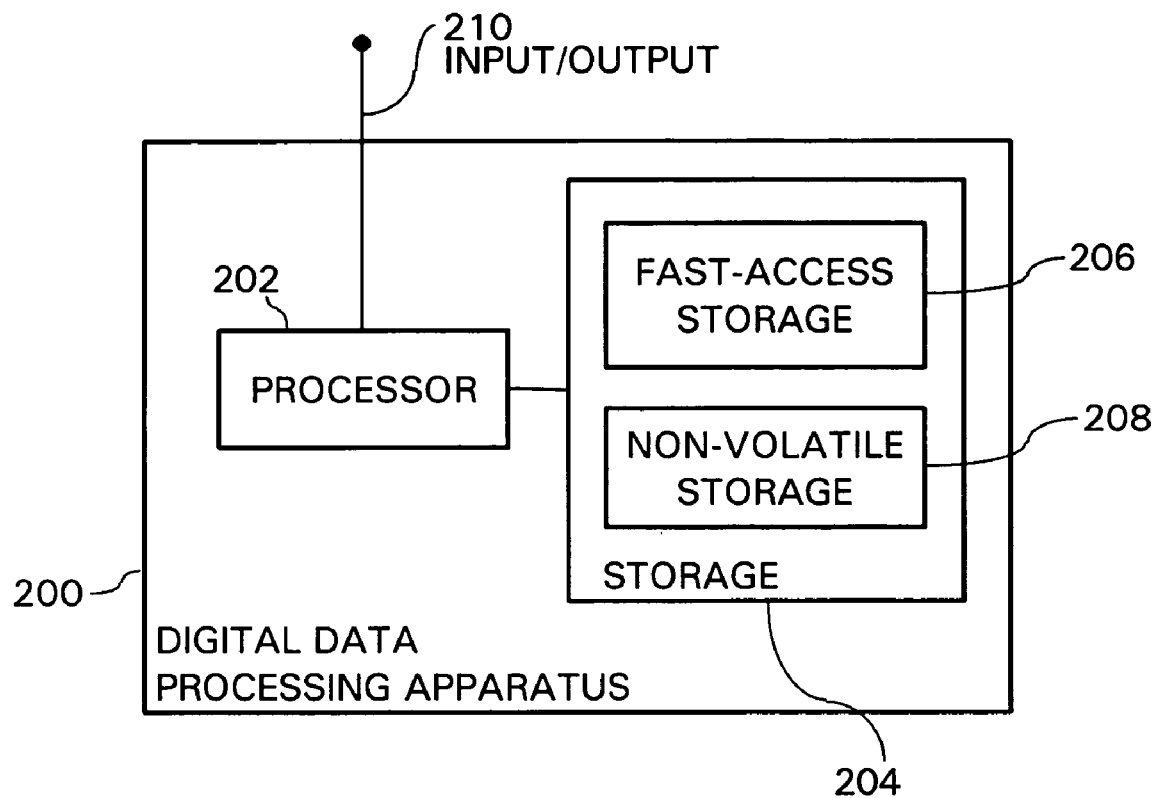
FIG. 2 is a block diagram of a digital data processing machine.
Figure 3:
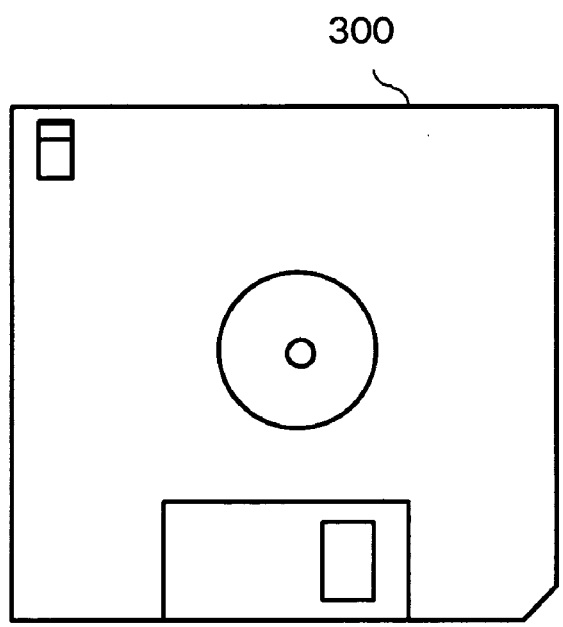
FIG. 3 shows an exemplary magnetic data storage diskette.

Wherever the functionality of any operational components of the disclosure is implemented using one or more machine-executed program sequences, these sequences may be embodied in various forms of computer readable data storage media. In the context of FIG. 2, such a computer readable data storage media may comprise, for example, the storage 204 or another computer readable data storage media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), or other suitable computer readable data storage media including analog or digital transmission media and analog and communication links and wireless communications. In one embodiment, the machine-readable instructions may comprise software object code, compiled from a language such as assembly language, C, etc.

Logic Circuitry

In contrast to the computer readable data storage medium discussed above, some or all functional components may be implemented using logic circuitry, instead of using a processor to execute instructions. Such logic circuitry is therefore configured to perform operations to carry out the method of the disclosure. The logic circuitry may be implemented using many different types of circuitry, as discussed above.

Overall Sequence of Operation

FIG. 4 shows a sequence 400 to illustrate one example of the method aspect of this disclosure. Broadly, this sequence illustrates a method for conducting secure synchronous online messages between prescribed subscribers by utilizing digital certificates to sign and encrypt the messages. For ease of explanation, but without any intended limitation, the example of FIG. 4 is described in the context of the system 100 described above.

Step 402 provides the center 108 for use by the clients. For example, technicians, engineers, software programmers, or other personnel in step 402 construct, install, configure, activate, or otherwise make the center 108 available for use by prescribed subscribers such as the clients 102, 104. Step 404 provides local instant messaging modules 102a, 104a for installation by the clients 102, 104. For example, in the illustrated example where the modules 102a/104a constitute software, the center 108 may make the software available online for Internet download, personnel may mail out storage media containing the software to potential subscribers, devices may be sold with the software pre-loaded, etc. The center 108 (of step 402) and software (of step 404) are configured to cooperatively utilize digital certificates to sign, encrypt, and exchange online synchronous messages between groups of two or more dialoging subscribers.

In step 406, the center 108 performs various administrative tasks related to the clients, including enrolling clients to participate in instant messaging service, providing clients with security indicia such as digital certificates, revoking digital certificates under prescribed circumstances, notifying clients of others clients certificate status, and other such operations. The clients 102, 104 also cooperate in the activities of step 406 where applicable.

In step 408, the clients 102, 104 exchange instant messages. In the case of text messages, the center 108 acts as a hub, receiving and relaying instant messages to the proper recipients. In the case of file exchange, these may be exchanged more directly between the clients 102/104, apart from the center 108 if desired. The center 108 and software 102a, 104a cooperatively utilize digital certificates to sign, encrypt, and exchange online synchronous messages between dialoging subscribers. These secure "messages" include message content as well as any attachments.

More Detailed Example

FIG. 5 shows a sequence 500 to illustrate the operations of the center 108 and the clients from enrollment through instant message exchange. The steps 500 utilize more detail to explain the events of steps 406-408, which were discussed above. As with the sequence 400, the present sequence 500 is explained in the context of the system 100, without any intended limitation. Even more particularly, the sequence 500 is discussed in the context of the client 102 as an exemplary client.

In step 502, the client 102 enrolls in the secured instant messaging service of the center 108. As one example of enrollment, the local IM module 102a may detect the user's first activation of the module 102a, namely the user's first attempt to use instant messaging after software installation, and respond by providing a pop-up window or other opportunity for the user to start the enrollment process. As another example, the module 102a may provide a menu entry, icon, periodic pop-up reminder, or other opportunity for the user to engage in enrollment some time in the future.

When the user decides to initiate enrollment, the module 102a must connect to (or already be connected to) the IM server 108a. Connection to the server 108a occurs by the module 102a contacting the server 108a via the Internet 106 and submitting a prescribed screen name and password (or other log-in indicia), whereupon the server 108a authenticates the user according to the account database 108d. The screen name/password may be specific to instant messaging service, or it may be universally used for other services such as e-mail, Internet service, etc. After connecting to the server 108a, the module 102a sends the server 108a a request to enroll in secured instant messaging.

The server 108a responds by enrolling the client 102 in secured instant messaging, which includes coordinating client payment (if any) by appropriate means such as credit card, invoice, online electronic payment, check, etc. The server 108a updates the account database 108d to reflect the client 102's enrollment in secured instant messaging, and notifies the client 102 of the successful enrollment.

Continuing in step 502, at some point the module 102a attempts to locate an existing security certificate (if any) in the local certificate store 102b. This may be conducted manually under direction of the user, automatically during enrollment, upon the first post-enrollment activation of the local instant messaging module 102a, by the client 102 machine as prompted by the server 108a's notification of successful enrollment, or at another appropriate time. If the module 102a does not find a local certificate, the module 102a will only conduct instant messages in a non-secure mode. In this case, when the user subsequently desires to start using encrypted instant messaging, the user may direct the module 102a to request a certificate from the server 108a, or the user may obtain a digital certificate independently of the center 108.

Whenever the user desires to obtain a certificate via the center 108, the user directs the module 102a to obtain a certificate, or approves the module's prompting of the user for such. The module 102a's certificate request, submitted to the server 108a, includes the user's screen name and password along any other relevant identifying information. The server 108a verifies the user's screen name and password in the account database 108d and also verifies that the user has enrolled for secure instant messaging. The server 108a then routes the certificate request to the registration authority 108c, which may be a component of the messaging service center 108 (as illustrated) or a third party service provider such as VERISIGN, etc. Ultimately, the registration authority 108c sends the client 102 a digital security certificate. In the illustrated example, each certificate may include a signed piece of data including a public key, the user's name (such as screen name or instant messaging account ID), and other such data. The certificate may also include a certificate chain, representing the certificate's path of origination. Finally, the client 102 stores the new certificate in the local store 102b, and then the module 102a automatically or manually recognizes the certificate for future use.

Generally, the content, issuance, and use of digital security certificates for public/private key encryption are well known in the relevant art. For example, public key encryption techniques such as RSA, Diffie-Hellman, and others are widely used. The following U.S. patents, incorporated by reference, describe various public key encryption techniques: (1) U.S. Pat. No. 4,200,770 to Hellman et al. entitled Cryptographic Apparatus and Method, (2) U.S. Pat. No. 4,218,582 to Hellman et al. entitled Public Key Cryptographic Apparatus and Method, (3) U.S. Pat. No. 4,405,829 to Rivest et al. entitled Cryptographic Communications System and Method, and (4) U.S. Pat. No. 4,424,414 to Hellman et al. entitled Exponentiation Cryptographic Apparatus and Method.

After step 502, step 504 starts an instant messaging session and steps 510-520 conduct an instant messaging dialog. A "session" refers to a period of two-way communications between a client and the server 108a while the client is logged-in with the ability to start exchanging instant messages with one or more other clients. A "dialog" refers to the connection between two or more clients via the server 108a, in which the clients actually exchange instant messages.

As mentioned above, step 504 begins a "session" between the client 102 and the server 108a. The session may start by the client 102 submitting, and the server 108a authenticating, the client's screen name, password, etc. Next, the client 102 publishes its user's digital certificate as condition to establishing communications with other clients such as 104. This may occur automatically when the session is established, or manually under user direction. Under various circumstances, publication may also be instituted at a later time, for example, where (1) the user decided not to publish at the time of starting an instant messaging session, (2) the client was unable to publish because the client's certificate was logically unavailable, e.g., locked by the user or another process running on the client, (3) the client was unable to publish because the certificate was physically unavailable, e.g., the certificate was located on smart card, floppy disk, or other removable media that was absent from the client machine, or (4) other circumstances. In the previous instances, publication may be conducted automatically, for example when the module 102a senses that the certificate is available, or manually when the user affirmatively directs the module 102a to publish.

When publication is instituted, the module 102a starts by determining whether there is an existing security certificate in the store 102b. According to one optional implementation of step 504, the module 102a may automatically search the client machine 102 or other user-designated sites for an existing user certificate to utilize, instead of obtaining a new certificate from the authority 108c. As another option, the module 102a may prompt the user to manually identify an existing certificate to import. For example, the user may already possess certificates for use in other programs, unrelated to the subject instant messaging application.

After locating the proper certificate, the module 102a proceeds by sending the certificate (including its certificate chain) to the server 108a. The server 108a temporarily stores the certificate and the certificate chain in the publication record 108e in association with the client's current session. The sending of the certificate to the server and subsequent storage therein may be referred to as "publishing" the certificate. To conserve storage space at the server 108a, the server may be programmed to recognize when different users have identical certificate chains, and in this case to abbreviate storage of the identical chains by representing duplicative certificate chains using pointers, abbreviations, or other shortened codes. When other clients activate their respective instant messaging modules (such as 104a) to begin a session, in step 504 or another earlier or later time, similar acts are performed to publish their certificates.

Optionally, each client may publish more than one certificate to the server 108a. For example, contents of one certificate may be used to sign instant messages and contents of another certificate may be used to encrypt instant messages.

The server 108a's storage of the client 102's certificate and certificate chain is temporary (as mentioned above), because the server 108a automatically removes the client's stored certificate and certificate chain when the client's session ends. Under one embodiment, the module 102a may relay a user's request to un-publish the current published certificate(s). In this case, the server 108a responds by removing the user's certificate from temporary storage, so that the user is not shown as being published. The module 102a may also trigger un-publication whenever the module 102a finds that the user's certificate is logically or physically unavailable.

After step 504, step 506 obtains and publishes revocation information for the client's security certificate. Generally, in publishing revocation information, a client asks the certificate issuer to affirm that the certificate is still valid, and notifies the server 108a of the results. Publishing revocation information is a different operation than publishing the client's certificate, but the two may be performed together and the publication of revocation information may also be performed whenever the user starts an instant messaging session. This entails the module 102a sending the server 108a a request to check status of the client 102's certificate at the revocation service 108b (or other, third party certificate issuer) in regard to possible revocation.

Revocation may occur in various circumstances. One example is where a user reports that the user's key has been compromised. Another example is where the screen name, identity, or other data in the certificate becomes invalid.

The server 108a forwards the request to the issuer of the certificate, which in the present example, is the revocation service 108b. The service 108b responds by providing the server 108a with certain revocation information for the user's certificate. The revocation information, for example, may include an affirmation that the certificate is presently valid and indicating when it will expire. This may be conducted, for example, according to the well known OCSP model. In the case where the revocation service 108b is a service of the center 108 (as illustrated), the server 108a completes publication of the revocation information by storing the information in the publication record 108e and also forwarding this data to the requesting module 102a.

In contrast, where a third party (non-center 108) revocation service is used, and revocation data arrives at the module 102a independent of the server 108a, the module 102a publishes the revocation information by transmitting it to the sever 108a with a request to publish the information, whereupon the server 108a stores the revocation data in the publication record 108e.

When the subscriber's certificate expires (as shown by the revocation information), the server 108a automatically removes the certificate and its related data from the publication record 108e.

Optionally, the module 102a may store the revocation information in the store 102b for the purpose of reusing the revocation information in a later session (without having to re-obtain and re-publish the revocation information) as long as the validity time period requirements are still met. As mentioned above, the client may publish revocation information along with the certificate; alternatively, if the certificate was already published, for example in step 504, the module 102*a* may withhold the certificate from its request to publish revocation information in step 506. Also occurring in step 506 (or at a previous time), other clients such as 104 perform similar acts to obtain and publish their respective revocation information.

In the embodiment where the client 102 publishes multiple certificates to the server 108*a*, revocation information may contain data about all of the certificates (one example), or separate revocation information may be published for each of the user's certificate (another example).

In step 508, the module 102*a* submits a request for "buddy information," namely, information about other users preselected by the user as candidates for future instant messaging sessions. In response to the request, the server 108*a* searches the publication record 108*e* to determine which buddies are online, that is, which buddies have already published their buddy information, with or without a certificate, to the server 108*a* in order to begin an instant messaging session. Then the server 108*a* provides a buddy listing to the client 102, this listing including an identification of which of the particular client's buddies are online, an abbreviated representation of each located buddy's valid certificate (if any), and the certificate's revocation information (or an abbreviated version of it). If the publication record 108*e* reveals that a buddy's certificate is invalid, the server 108*a* may withhold the certificate from the client 102 in order to prevent the client 102 from engaging in secured communications with that buddy.

As an example, the abbreviated certificate may be prepared by processing the certificate with a hash, digest, encryption, or other algorithm that can be replicated with the same results at the client machines. As an alternative to the foregoing "pull" example, the server 108*a* may provide buddy information automatically ("push"), without regard for whether a client request has been received.

At any rate, throughout the client's instant messaging session with the server 108*a*, the server 108*a* may from time to time distribute updated buddy information to the client 102 in order to reflect newly published certificates of the client 102's buddies, expiration of certificates for on-line buddies, etc.

Also in step 508, the module 102*a* reconciles buddy information where appropriate. For each buddy that the server 108*a* lists with a security certificate, the module 102*a* determines whether it contains a certificate for that buddy in its store 102*b*. If there is no locally stored certificate, the module 102*a* requests that buddy's certificate from the server 108*a*. On the other hand, if there is a locally stored certificate for a buddy, the module 102*a* applies the predetermined algorithm (hash, digest, etc.) to the locally stored certificate and compares the results to the abbreviation received from the server 108*a* in the buddy list. If they do not match, the module 102*a* requests an updated certificate from the server 108*a*.

After step 508, the user starts a dialog with one or more buddy clients in step 510. For ease of discussion, the targeted buddy in this example is the user of client 104. More particularly, in step 510 the user selects an appropriate software icon, menu entry, or other feature instructing the module 102*a* to initiate a dialog with the client 104. In the interest of brevity, further details are omitted regarding the commencement of an unsecured instant messaging dialog between clients, as various embodiments are already known to those of ordinary skill in the art.

Having initiated the instant messaging dialog (step 510), secured communications are relayed between the dialoguing clients in step 511. In step 514, the local modules 102*a*/104*a* may exchange secured instant messages using the server 108*a* as a relay. The messages are instant, or in other words "synchronous" because they are delivered from client to client in substantial real time, as opposed to asynchronous message delivery means such as e-mail. As a condition to exchanging secured text messages, each local module 102*a*/104*a* may first verify that the other client's certificate is not un-published, revoked, or otherwise invalid. This information may be obtained from the server 108*a*, for example in step 508 as discussed above, or directly from the certificate issuer. If one client's certificate is invalid, the other local module refrains from secured communications with that client. The server 108*a* may also act as a gate, preventing any exchange of secured text messages with the buddy client 104 if that client's certificate is or becomes invalid, un-published, revoked, etc.

In the case where each client possesses the other client's valid and published certificate, secured communications are therefore possible. Accordingly, dialoguing modules 102*a*/104*a* use their respective certificate information to sign and encrypt message contents for sending to the other, and the modules 102*a*/104*a* use the other module's certificate information to verify authenticity and decrypt arriving messages. As one example, text messages may utilize be formatted and assembled using a protocol such as S/MIME or PGP. Further details of encryption using public/private key algorithms, digital signatures, and related techniques are omitted, as they will be apparent to ordinarily skilled artisans having the benefit of this disclosure. Step 514 is repeated 514*a* as necessary, as individual messages are encrypted, sent, received, and decrypted. Secured text messages are relayed between the clients 102/104 by the server 108*a*.

In addition to the exchange of secured messages (step 514), the clients may also exchange secured files (step 516). This is shown after step 516 for purposes of illustration, although steps 514/516 may actually occur concurrently or in the opposite order. Depending upon the desired implementation of step 516, files may be exchanged independently from text messages, or as secured attachments to secured instant messages. Broadly, in steps 516 the clients arrange for secured file transfer, and in step 518 the clients exchange the secured file.

More particularly, the clients 102, 104 in step 516 make arrangements to exchange a secured file. In the present embodiment, arrangements to exchange the secured file are made by the modules 102*a*/102*b* exchanging secured instant messages, which may be invisible to the clients' users. More particularly, the originating module 102*a* sends a proposal instant message to the module 104*a* proposing a file transfer; the server 108*a* delivers the proposal instant message to the module 104*a*; the module 104*a* accepts the proposal, sending an acceptance instant message that is forwarded to the module 102*a* by the server 108*a*. After accepting the first client's proposal, the second module 104*a* prepares to receive the secured file.

After preparations for file transfer have been completed in step 516, the clients 102, 104 exchange the file in step 518. The file may be relayed directly between clients, or via an intermediary. Direct exchange may employed, for example, to conserve resources of the potential intermediary. One example of direct client-to-client communications is secure socket layer (SSL) communications. SSL is widely known in the art, as described in a variety of AOL patents such as U.S. Pat. Nos. 5,657,390 and 5,671,279, incorporated by reference. Other examples of direct client-to-client protocols include virtual private network (VPN) protocols such as IPSEC, etc. Instead of direct relay, the clients may exchange the file via the server 108*a* or a third party rendezvous server (which is used when one or both of the clients are located behind a firewall preventing direct file exchanges). In any case, the file is exchanged using the certificates to ensure authenticity and using the certificate's keys for encryption.

Steps 516-518 may be repeated as needed to exchange as many secured files as desired. In addition, step 514 may be repeated as desired to exchange as many secured text messages as desired. The dialog ends (step 520) when one or both clients 102, 104 direct their modules 102a/104a to end the dialog. The client 102's instant messaging session may persist or it may be concluded independently of terminating the dialog with client 104. To start a new dialog with the same or a different client, the client 102 returns (522) to step 510.

Other Embodiments

While the foregoing disclosure shows a number of illustrative embodiments, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information may be represented using a variety of different technologies and techniques. For example, any data, instructions, commands, information, bits, symbols, and chips referenced herein may be represented by voltages, currents, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To illustrate one exemplary embodiment, various functional aspects of the invention have been described in terns of illustrative components, blocks, modules, circuit, and steps. Whether such functionality is implemented as hardware, software, or both depends upon the particular application and design constraints imposed on the overall system. Skilled artisans may implement the described functionality in varying ways for each particular application without such implementation decisions departing from the scope of the present invention.

What is claimed is:

1. A method of managing exchange of secure online instant messages between subscriber devices, where the secure messages are signed and encrypted using subscribers' digital certificates, the method comprising steps of:

a messaging server receiving a log-in request from at least one subscriber device comprising a local instant messaging module to begin a session of exchanging synchronous online messages;

the local instant messaging module submitting a certificate publication request to the messaging server, the publication request also specifying a digital certificate corresponding to the subscriber device;

the messaging server receiving the certificate publication request from said local instant messaging module;

responsive to the certificate publication request, the messaging server temporarily storing the digital certificate in a publication record in association with the subscriber device as long as the associated instant messaging module remains logged-in to the messaging server;

responsive to prescribed events, the messaging server providing logged-in subscriber devices with selected information concerning certificates of other subscriber devices;

responsive to a particular subscriber device ending the session, the messaging server automatically removing the digital certificate from the publication record for the particular subscriber device;

receiving a particular subscriber device's request to un-publish the digital certificate and in responsive to receiving the request to un-publish the digital certificate, the messaging server removing the digital certificate from the publication record for the particular subscriber device;

identifying other logged-in subscriber devices that previously designated the particular subscriber device for potential future secured instant messaging; and notifying the identified other logged-in subscriber devices that the digital certificate for the particular subscriber device is withdrawn from use.

2. The method of claim 1, the operation of, responsive to prescribed events, providing logged-in subscriber devices with selected information concerning certificate status of other subscriber devices comprising:

responsive to a request from one subscriber device to establish a dialog with another subscriber device, the messaging server providing the requesting subscriber device with a representation of a digital certificate of the other subscriber device from the publication record.

3. The method of claim 1, the operation of, responsive to prescribed events, providing logged-in subscriber devices with selected information concerning certificate status of other subscriber devices comprising:

responsive to a particular subscriber device's request to publish a new digital certificate, the messaging server identifying other logged-in subscriber devices that have designated the particular subscriber device for potential future secured instant messaging, and providing the identified devices with a representation of the new digital certificate.

4. The method of claim 1, further comprising:

the particular subscriber device submitting the request to un-publish its digital certificate in response to at least one of the following events: (1) physical unavailability of the subscriber device's digital certificate, (2) logical unavailability of the subscriber device's corresponding digital certificate, (3) user election to un-publish the subscriber device's digital certificate.

5. The method of claim 1, the operation of, responsive to prescribed events, providing logged-in subscriber devices with selected information concerning certificate status of other subscriber devices comprising:

responsive to a request from a first subscriber device to establish a dialog with a second subscriber device, the messaging server denying supplication of the second subscriber's digital certificate to the first subscriber whenever the second subscriber's digital certificate has experienced one or more of the following actions: invalidity, revocation, un-publication.

6. The method of claim 1, further comprising:

delaying submittal of the certificate publication request under preventive circumstances including at least one of the following: (1) physical unavailability of the digital certificate, (2) logical unavailability of the digital certificate, (3) user election to delay publication of the digital certificate.

7. The method of claim 6, further comprising:
automatically submitting the certificate publication request when the preventive circumstances terminate.

8. The method of claim 1, the operation of, responsive to prescribed events, providing logged-in subscriber devices with information concerning certificate status of other subscriber devices comprising:
responsive to a particular subscriber device's published certificate becoming invalid, the messaging server identifying other logged-in subscriber devices that previously designated the particular subscriber device for potential future secured instant messaging, and notifying the identified devices of the invalid digital certificate.

9. The method of claim 1, the operation of temporarily storing the submitted digital certificate additionally storing a representation of a chain record pertaining to the certificate, where storage of repetitive chain records are abbreviated to conserve storage space.

10. The method of claim 1, the act of submitting the publication request is performed under one or more of the following conditions: (1) automatically in response to the act of logging in to the messaging server, (2) manually in response to operator direction.

11. The method of claim 1, further comprising operations of:
at one or more of the logged-in devices, an associated local instant messaging module submitting a certificate un-publication request to the messaging server responsive to specified conditions;
responsive to each un-publication request, the messaging server removing the requesting subscriber's digital certificate from the publication record.

12. The method of claim 1, where:
the operations further comprise, responsive to each publication request, the messaging server receiving revocation information for the subscriber's certificate;
upon expiration of the certificate as indicated by the revocation information, removing the subscriber's certificate from the publication record.

13. The method of claim 1, further comprising:
at one or more of the logged-in devices, the associated local instant messaging module obtaining revocation information for the digital certificate corresponding to the subscriber device;
the messaging server temporarily storing the obtained revocation information in the publication record in association with the submitting device as long as the associated instant messaging module remains logged-in to the messaging server.

14. The method of claim 13, the operations further comprising:
the respective local instant messaging module storing the obtained revocation information and, as long as the associated digital certificate is still valid, utilizing the revocation information in future sessions to avoid having to re-obtain the revocation information.

15. The method of claim 1, further comprising operations of:
prior to engaging in secured communications with a first subscriber device, a second subscriber device's local instant messaging module communicating with the messaging server to determine whether the first subscriber device's digital certificate is valid, and if not, refraining from secured synchronous communications with the first subscriber device.

16. A messaging server for use in managing an exchange of secure online instant messages between subscriber devices, where secure messages are signed and encrypted using subscribers' digital certificates, a messaging server comprising:
a computer-readable data storage medium; and
at least one digital data processor coupled to the computer-readable data storage medium, the data processor programmed to perform operations comprising:
beginning a session of exchanging synchronous online messages by receiving log-in from a local instant messaging module associated with a subscriber device;
receiving from the logged-in device's associated local instant messaging module a certificate publication request specifying a digital certificate corresponding to a particular subscriber device;
responsive to the certificate publication request, temporarily storing the digital certificate in a publication record in association with the particular subscriber device as long as the associated instant messaging module remains logged-in to the messaging server;
responsive to prescribed events, providing other logged-in subscriber devices with selected information concerning the digital certificate for the particular subscriber device;
responsive to a particular subscriber device end the session, the messaging server automatically removing the digital certificate from the publication record for the particular subscriber device;
receiving a particular subscriber device's request to un-publish the digital certificate and in responsive to receiving the request to un-publish the digital certificate, the messaging server removing the digital certificate from the publication record for the particular subscriber device;
identifying other logged-in subscriber devices that previously designated the particular subscriber device for potential future secured instant messaging; and
notifying the identified other logged-in subscriber devices that the digital certificate for the particular subscriber device is withdrawn from use.

17. The messaging server of claim 16, the processor programmed such that the operation of, responsive to prescribed events, providing logged-in subscriber devices with selected information concerning certificate status of other subscriber devices comprises:
responsive to a request from one subscriber device to establish a dialog with another subscriber device, the messaging server providing the requesting subscriber device with a representation of a digital certificate of the other subscriber device from the publication record.

18. The messaging server of claim 16, the processor programmed such that the operation of, responsive to prescribed events, providing logged-in subscriber devices with selected information concerning certificate status of other subscriber devices comprises:
responsive to a particular subscriber device's request to publish a new digital certificate, the messaging server identifying other logged-in subscriber devices that have designated the particular subscriber device for potential future secured instant messaging, and providing the identified devices with a representation of the new digital certificate.

19. The messaging server of claim 16, the processor programmed such that the operation of, responsive to prescribed events, providing logged-in subscriber devices with selected information concerning certificate status of other subscriber devices comprises:

responsive to a request from a first subscriber device to establish a dialog with a second subscriber device, server denying supplication of the second subscriber's digital certificate to the first subscriber whenever the second subscriber's digital certificate has experienced one or more of the following actions: invalidity, revocation, un-publication.

20. The messaging server of claim 16, the processor programmed such that the operation of, responsive to prescribed events, providing logged-in subscriber devices with information concerning certificate status of other subscriber devices comprises:

responsive to a particular subscriber device's published certificate becoming invalid, identifying other logged-in subscriber devices that previously designated the particular subscriber device for potential future secured instant messaging, and notifying the identified devices of the invalid digital certificate.

21. The messaging server of claim 16, the processor programmed such that the operation of temporarily storing the submitted digital certificate additionally comprises storing a representation of a chain record pertaining to the certificate, where storage of repetitive chain records are abbreviated to conserve storage space.

22. The messaging server of claim 16, the processor additionally programmed to perform operations comprising:

responsive to each logged-in subscriber device's request to un-publish a digital certificate, the messaging server removing the requesting subscriber's digital certificate from the publication record.

23. The messaging server of claim 16, where:

the processor is programmed to perform further operations, comprising, responsive to each publication request, the messaging server receiving revocation information for the subscriber's certificate, and upon expiration of the certificate as indicated by the revocation information, removing the subscriber's certificate from the publication record.

* * * * *